US011071249B2

(12) United States Patent
Hong et al.

(10) Patent No.: US 11,071,249 B2
(45) Date of Patent: Jul. 27, 2021

(54) LAWN MOWER ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 283 days.

(21) Appl. No.: 16/375,294

(22) Filed: Apr. 4, 2019

(65) Prior Publication Data

US 2019/0307064 A1 Oct. 10, 2019

Related U.S. Application Data

(60) Provisional application No. 62/653,568, filed on Apr. 6, 2018.

(30) Foreign Application Priority Data

Nov. 19, 2018 (KR) ........................ 10-2018-0142918

(51) Int. Cl.
*A01D 34/81* (2006.01)
*A01D 34/00* (2006.01)
(Continued)

(52) U.S. Cl.
CPC ........... *A01D 34/81* (2013.01); *A01D 34/008* (2013.01); *A01D 34/64* (2013.01); *A01D 2101/00* (2013.01)

(58) Field of Classification Search
CPC .... A01D 34/008; A01D 34/736; A01D 34/78; A01D 34/81; A01D 34/82; A01D 34/64;
(Continued)

(56) References Cited

U.S. PATENT DOCUMENTS 2,464,912 A 3/1949 White
3,114,229 A 12/1963 Wilson
(Continued)

FOREIGN PATENT DOCUMENTS

AU 2015418271 6/2017
CN 102523841 7/2012
(Continued)

OTHER PUBLICATIONS

European Search Report dated Dec. 17, 2019 issued in EP Application No. 19167046.2.
(Continued)

*Primary Examiner* — Abigail A Risic
(74) *Attorney, Agent, or Firm* — KED & Associates, LLP

(57) ABSTRACT

A lawn mower robot includes an outer cover; an inner body accommodated into the outer cover to mount a plurality of wheels on sides thereof; a plurality of blades rotatably mounted on a bottom surface of the inner body to mow grass; a plurality of support portions arranged in front-rear and left-right directions on an upper portion of the inner body to movably support the outer cover in front-rear and left-right directions with respect to the inner body; a UI module mounted on an upper portion of the inner body, and provided with a user control panel and an information display unit on an upper portion thereof; and a UI dust cover mounted on an inner side of the outer cover to block dust inside the outer cover from entering into the user control panel and the information display unit, thereby preventing dust from entering into the UI module.

20 Claims, 8 Drawing Sheets

(51) Int. Cl.
*A01D 34/64* (2006.01)
*A01D 101/00* (2006.01)

(58) Field of Classification Search
CPC ...... A01D 34/74; A01D 34/66; A01D 34/007; A01D 2101/00
See application file for complete search history.

(56) References Cited

U.S. PATENT DOCUMENTS

| | | | |
|---|---|---|---|
| 4,194,345 | A | 3/1980 | Pioch et al. |
| 4,835,952 | A | 6/1989 | McLane |
| 5,259,175 | A | 11/1993 | Schmidt |
| 6,470,588 | B1 | 10/2002 | Pilger |
| 6,999,850 | B2 | 2/2006 | McDonald |
| 7,171,799 | B2 | 2/2007 | Takeishi et al. |
| 8,234,848 | B2 * | 8/2012 | Messina .......... A01D 34/81 56/17.1 |
| 8,336,282 | B2 | 12/2012 | Messina et al. |
| 8,387,193 | B2 * | 3/2013 | Ziegler .......... B60B 33/0021 15/50.1 |
| 9,021,777 | B2 | 5/2015 | Johnson et al. |
| 9,027,189 | B2 | 5/2015 | Hickenbottom et al. |
| 9,807,930 | B1 | 11/2017 | Lydon et al. |
| 10,299,432 | B1 | 5/2019 | Kelly et al. |
| 10,375,880 | B2 | 8/2019 | Morin et al. |
| 10,555,457 | B2 | 2/2020 | Song et al. |
| 2005/0021181 | A1 | 1/2005 | Kim et al. |
| 2005/0044836 | A1 | 3/2005 | Goto et al. |
| 2012/0023880 | A1 | 2/2012 | Messina et al. |
| 2012/0023887 | A1 | 2/2012 | Messina et al. |
| 2013/0061417 | A1 | 3/2013 | Vanderstegen-Drake et al. |
| 2013/0291506 | A1 | 11/2013 | Johnson et al. |
| 2014/0216424 | A1 | 8/2014 | Gartzke et al. |
| 2015/0271991 | A1 | 10/2015 | Balutis |
| 2016/0000007 | A1 | 1/2016 | Bian et al. |
| 2016/0014956 | A1 | 1/2016 | Matsumoto et al. |
| 2016/0081526 | A1 | 3/2016 | Gottinger et al. |
| 2016/0128275 | A1 | 5/2016 | Johnson |
| 2016/0278287 | A1 | 9/2016 | Kasai et al. |
| 2016/0338262 | A1 * | 11/2016 | Liu .......... B08B 13/00 |
| 2017/0181375 | A1 | 6/2017 | Hashimoto et al. |
| 2018/0116109 | A1 | 5/2018 | Matsumoto |
| 2018/0184583 | A1 | 7/2018 | Morin et al. |
| 2018/0184585 | A1 | 7/2018 | Song et al. |
| 2018/0199506 | A1 | 7/2018 | Ito et al. |
| 2018/0235146 | A1 | 8/2018 | Hashimoto et al. |
| 2018/0271014 | A1 | 9/2018 | Matsuzawa et al. |
| 2019/0216012 | A1 | 7/2019 | Hahn et al. |
| 2019/0223376 | A1 | 7/2019 | Lee et al. |
| 2019/0258267 | A1 | 8/2019 | Hahn et al. |
| 2019/0278269 | A1 | 9/2019 | He et al. |
| 2020/0170186 | A1 | 6/2020 | Curtis |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 513 644 | 7/2019 |
| JP | 2012-105557 | 6/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

European Search Report dated Aug. 22, 2019 issued in EP Application No. 19152775.3.
European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in EP Application No. 19167046.2.
European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
Korean Notice of Allowance dated Nov. 23, 2020 issued in KR Application No. 10-2018-0123916.
Korean Notice of Allowance dated Dec. 8, 2020 issued in KR Application No. 10-2018-0142916.
Korean Notice of Allowance dated Dec. 8, 2020 issued in KR Application No. 10-2018-0142917.
Korean Office Action dated May 15, 2020 issued in KR Application No. 10-2018-0123916.
Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.
Korean Notice of Allowance dated Jan. 5, 2021 issued in KR Application No. 10-2018-0121333.
United States Office Action dated Mar. 4, 2021 issued in U.S. Appl. No. 16/260,865.
United States Office Action dated Mar. 4, 2021 issued in U.S. Appl. No. 16/264,494.
U.S. Appl. No. 16/260,865, filed Jan. 29, 2019.
U.S. Appl. No. 16/264,494, filed Jan. 31, 2019.
U.S. Appl. No. 16/373,050, filed Apr. 2, 2019.

(56) References Cited

OTHER PUBLICATIONS

U.S. Appl. No. 16/375,424, filed Apr. 4, 2019.
U.S. Appl. No. 16/375,505, filed Apr. 4, 2019.
U.S. Appl. No. 16/375,217, filed Apr. 4, 2019.
U.S. Appl. No. 16/375,294, filed Apr. 4, 2019.
U.S. Appl. No. 16/375,400, filed Apr. 4, 2019.
United States Office Action dated Mar. 11, 2021 issued in U.S. Appl. No. 16/375,400.
United States Office Action dated Mar. 16, 2021 issued in U.S. Appl. No. 16/375,217.
United States Office Action dated Apr. 9, 2021 issued in U.S. Appl. No. 16/375,505.
United States Office Action dated Apr. 12, 2021 issued in U.S. Appl. No. 16/373,050.
United States Office Action dated Apr. 12, 2021 issued in U.S. Appl. No. 16/375,424.

* cited by examiner

LAWN MOWER ROBOT

CROSS-REFERENCE TO RELATED APPLICATIONS

Pursuant to 35 U.S.C. § 119(a), this application claims the benefit of the earlier filing date and the right of priority to U.S. Provisional Application No. 62/653,568, filed on Apr. 6, 2018, and Korean Application No. 10-2018-0142918, filed on Nov. 19, 2018, the contents of each of which is incorporated by reference herein in its entirety. This application is also related to U.S. application Ser. No. 16/373,050, filed Apr. 2, 2019, U.S. application Ser. No. 16/375,424 filed Apr. 4, 2019, U.S. application Ser. No. 16/375,505 filed Apr. 4, 2019, U.S. application Ser. No. 16/375,217, filed Apr. 4, 2019, and U.S. application Ser. No. 16/375,400 filed Apr. 4, 2019, whose entire disclosures are also hereby incorporated by reference. This application is also related to U.S. patent application Ser. No. 16/260,865 filed on Jan. 29, 2019 and U.S. patent application Ser. No. 16/264,494 filed on Jan. 31, 2019.

BACKGROUND

1. Field

The present disclosure relates to a lawn mower robot for mowing the grass with a blade rotated by a motor.

2. Background

Lawn mower is a device for cutting and trimming the grass planted in a yard at home, a playground, a golf course, or the like. In recent years, an automated robot-type lawn mower has been developed to reduce a user's labor of having to manually operate a lawn mower to mow the grass and reduce an additional cost incurred by hiring outsiders to mow the grass.

A lawn mower robot may be traveled by rotating a plurality of wheels with an electric motor mounted on both front and rear sides of a robot body, and a traveling direction of the robot may be manipulated by controlling the number of revolutions of electric motor. The lawn mower robot may be mounted with a motor inside an inner body to rotate a blade using the power of the motor so as to cut the grass.

A robotic mower contact detection system has been disclosed in prior patent U.S. Patent Publication No. 2016/0128275 (Pub. Date: May 12, 2016). The prior patent discloses that a control panel is detachably mounted to a top cover, and the control panel may be connected to a vehicle control unit such that an operator inputs various commands using a keypad.

However, the lawn mower robot is a product used outdoors, and thus when dust is accumulated on a display screen, a keypad, and the like of a control panel, a user may visually see the display screen blurred by the dust, and there is a risk that the keypad may be erroneously operated. In addition, there is a need to wipe dust or the like every time dust accumulates on the display screen and the keypad.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
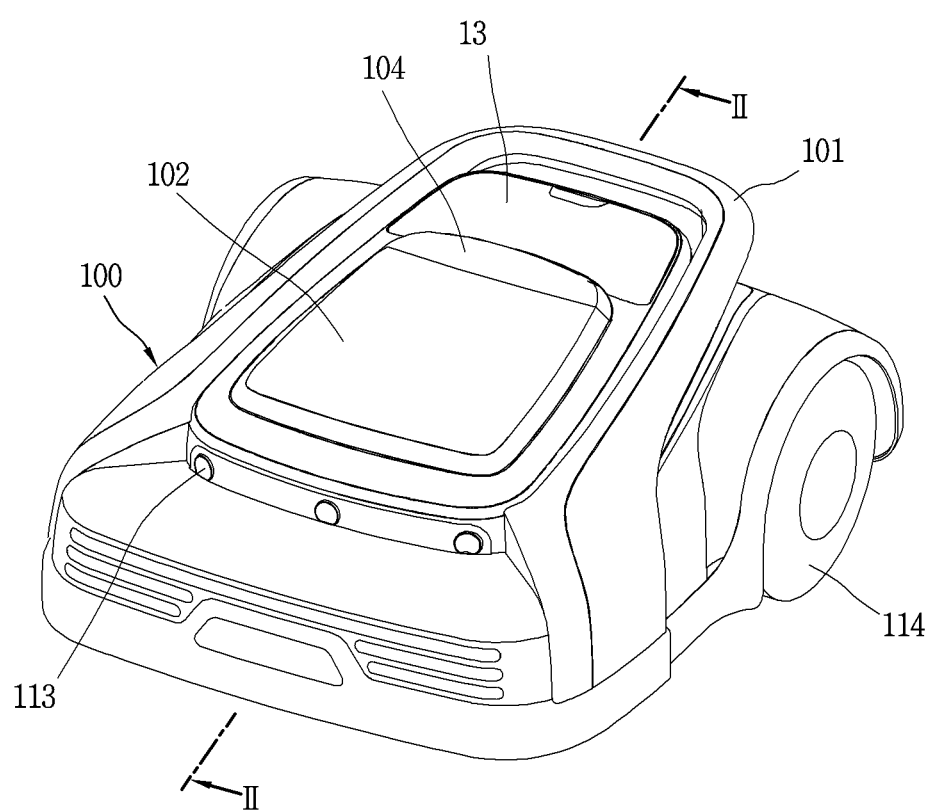
FIG. 1 is a perspective view showing an appearance of a lawn mower robot according to the present disclosure.

Hereinafter, the embodiments disclosed herein will be described in detail with reference to the accompanying drawings, and the same or similar elements are designated with the same numeral references regardless of the numerals in the drawings and their redundant description will be omitted. In this specification, UI is an abbreviation of User Interface, including a function of controlling the operation of the lawn mower robot or acquiring necessary information from the lawn mower robot.

Figure 2:
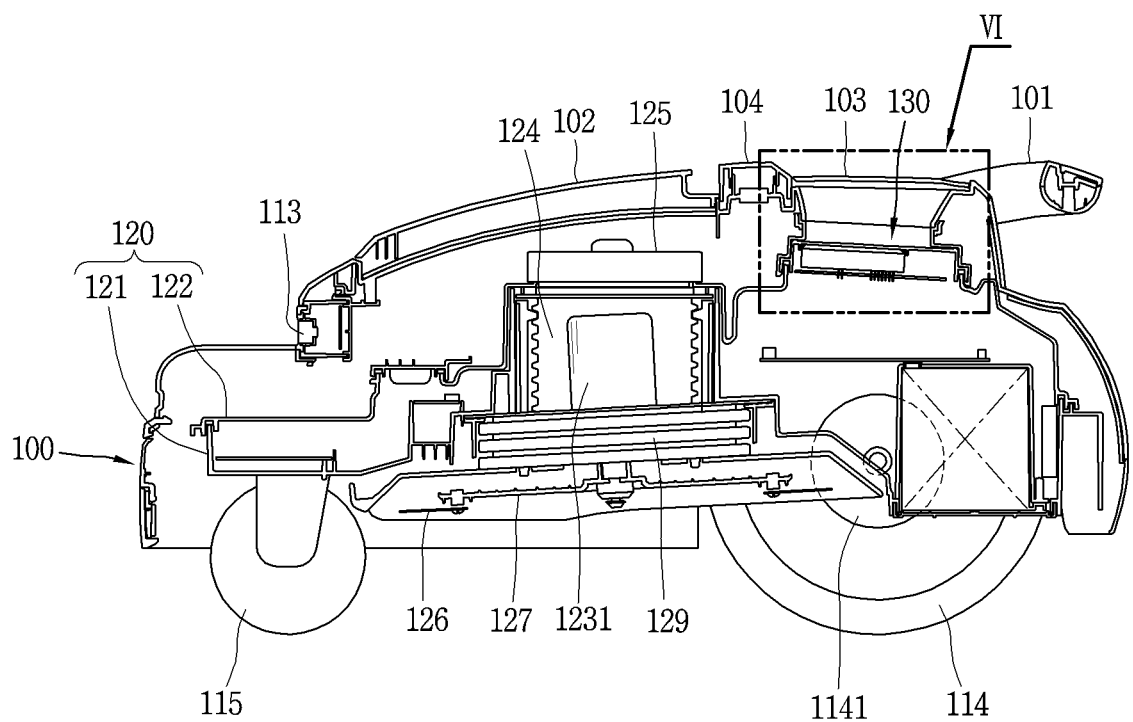
FIG. 2 is a cross-sectional view taken along line II-II in FIG. 1.
Figure 3:
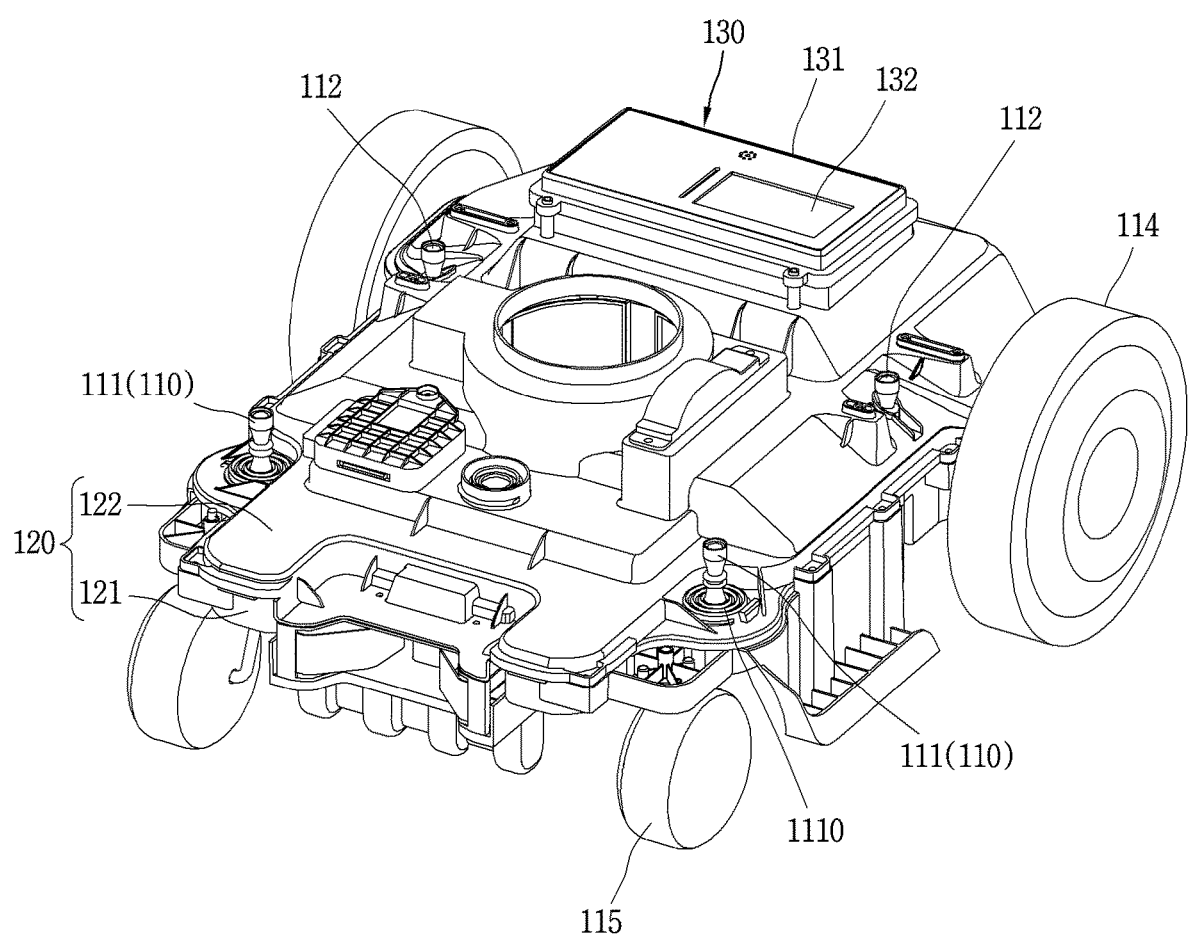
FIG. 3 is a conceptual view showing an inner body subsequent to removing an outer cover in FIG. 1.

FIG. 1 is a perspective view showing an appearance of a lawn mower robot according to the present disclosure, and FIG. 2 is a cross-sectional view taken along line II-II in FIG. 1, and FIG. 3 is a conceptual view showing an inner body (or inner frame) 120 subsequent to removing an outer cover 100 in FIG. 1.

The lawn mower robot of the present disclosure includes an outer cover 100 and an inner body 120. The outer cover 100 may be configured with a structure in which an upper surface, a front surface, a rear surface, a left surface, and a right surface thereof are closed, and a lower portion thereof is open. A receiving space may be formed inside the outer cover 100 to accommodate the inner body 120.

The outer cover 100 is configured to enclose the inner body 120. The inner body 120 may be accommodated into the outer cover 100. The outer cover 100 may be spaced apart from the inner body 120 in up-down, front-rear and left-right directions. The outer cover 100 may be supported movably in front-rear and left-right directions with respect to the inner body 120 by a plurality of support portions (or support posts) 110.

The plurality of support portions 110 may be disposed to be spaced apart from each other in front, rear, left and right directions on an upper portion of the inner body 120. For example, two front support portions 111 may be spaced apart from each other in a width direction on a front side of the inner body 120, and two rear support portions 112 may be spaced apart in a width direction on a rear side of the inner body 120.

Each of the plurality of support portions 110 may be made of a rubber material. Each of the plurality of support portions 110 is formed in a cylindrical rod shape elongated in a vertical direction, and formed to have a smaller cross-sectional area from an upper end portion to a middle portion thereof or from a lower end portion to a middle portion thereof.

For each of the plurality of support portions 110, an upper end portion thereof may be fastened to the outer cover 100 and a lower end portion thereof may be fastened to the inner body 120. The front support portion 111 of the plurality of support portions 110 may have a corrugated portion 1110 extended in a bellows shape in a radial direction at a lower end portion thereof.

The front support portion 111 may elastically support the outer cover 100 so as to be movable in front, rear, left, and right directions with respect to the inner body 120 by the corrugated portion 1110. The rear support portion 112 may elastically support the outer cover 100 by bending the upper end portion in front, rear, left, and right directions about the lower end portion. When the outer cover 100 may move in front, rear, left, and right directions with respect to the inner body 120 while colliding with obstacles, thereby mitigating an impact.

A plurality of ultrasonic sensor modules 113 may be mounted on a front side of the outer cover 100. The plurality of ultrasonic sensor modules 113 may be spaced apart in a width direction. Each of the plurality of ultrasonic sensor modules 113 may transmit ultrasonic waves and receive reflection waves reflected by obstacles to sense an obstacle located in front of the ultrasonic sensor module 103.

An ultrasonic guide unit may be formed in a planar shape on a front side of the outer cover 100, and the ultrasonic guide unit may be extended forward from a lower portion of the plurality of ultrasonic sensor modules 113, 113, thereby limiting ultrasonic waves to be transmitted at a predetermined height or more.

A handle 101 may be provided at an upper portion of the outer body to allow the user to grip the handle 101 with his or her hand to carry the robot. The handle 101 may be composed of a front fastening portion, an intermediate inclined portion, and a rear grip portion.

The front fastening portions are respectively fastened to both front side surfaces of the outer cover 100, and the intermediate inclined portions may be extended rearward in an upwardly inclined manner from the front fastening portions. The rear grip portion, which is a portion held by the user with his or her hand, may be configured to connect a rear end portion of the intermediate inclined portion.

A first upper cover 102 and a second upper cover 103 may be mounted on an upper portion of the outer cover 100 so as to be open and closed. Each of the first upper cover 102 and the second upper cover 103 may be coupled to the inner body 120 with a hinge at a front end thereof, and thus a rear end thereof may be rotatably mounted in a vertical direction.

The first upper cover 102 may be formed in a downwardly inclined manner from a rear end thereof to a front end thereof such that the front end is located lower than the rear end in a length direction. The first upper cover 102 may be formed in a downwardly inclined manner in right and left directions from a central portion thereof such that the left and right end portions of the first upper cover 106 are located lower than the center portion. According to such a configuration, the first upper cover 102 and the second upper cover 103 may guide rainwater to flow downward to an outer lower portion thereof without being collected in an upper portion of the outer cover 100 during raining.

A stop switch 104 may be provided in a pushable manner between the first upper cover 102 and the second upper cover 103. The stop switch 104 may be used by the user in an emergency. The stop switch 104 may be located slightly higher than the first and second upper covers 102, 103, and configured to be located at the same position as the rear grip portion of the handle 101.

According to such a configuration, when the robot passes an obstacle such as a branch or the like at a position lower than the height of the robot, the stop switch 104 may be pushed in touch with the obstacle ahead of the rear grip portion of the handle 101 to stop the robot and prevent the handle 101 from being caught by the obstacle.

A rain sensor 105 may be provided on one side of the upper portion of the outer cover 100 to sense rain during raining. According to such a configuration, the lawn robot may be configured to sense rain through the rain sensor 105 and return to a charging stand.

The plurality of rain sensors 105 may be provided. The rain sensors 105 may be configured to sense a change in capacitance and sense an amount of rainwater by the impact and attachment of water thereto when raindrops are in contact therewith.

Wheel drive motors 1141 may be mounted on both sides of the inner body 120 to drive the robot. The wheel drive motor 1141 has a drive shaft, and a wheel 114 may be connected to the drive shaft. A plurality of wheels 114 may be rotated by receiving a rotational force from the wheel drive motor 1141 through the drive shaft.

The plurality of wheels 114 may be independently driven by the wheel drive motor 1141. The plurality of wheel drive motors 1141 are independently connected to the plurality of wheels 114, and the number of revolutions may be controlled differently from the control unit.

A plurality of casters 115 may be orbitably mounted on a bottom surface of the inner body 120 in a left-right direction about a central shaft vertically extended. According to such a configuration, the control unit controls the plurality of wheel drive motors 1141 to control the number of rotations of the wheels 114 differently, thereby allowing the robot to travel in a desired direction.

The lawn mower robot may have a blade assembly inside the inner body 120 to cut the grass. The blade assembly may be disposed at a central portion of the inner body 120. The blade assembly may include a lifting frame 123, a plurality of blades 126, a rotating plate 127, a blade protection cover 128, a rotating cylindrical portion 124, a height adjusting knob 125, and the like.

The blade assembly is located at a lower portion of the first upper cover 102, and when the first upper cover 102 is open, the height adjusting knob 125 of the blade assembly may be seen by the user. The user may adjust the height of the blade 126 using the height adjusting knob 125.

The lifting frame 123 may be mounted into the inner body 120 in a vertically movable manner. The blade drive motor 1231 may be mounted into the lifting frame 123. A motor shaft may be configured to protrude through a lower portion of the lifting frame 123 at a lower portion of the blade drive motor 1231, and coupled to a shaft coupling portion formed at a center portion of the rotating plate 127 to rotate the rotating plate 127 by receiving power from the blade drive motor 1231.

The rotating plate 127 may be rotatably mounted on a bottom surface of the lifting frame 123. The plurality of blades 126 and the rotating plate 127 may be rotatably disposed on a bottom surface (or lower surface) of the inner body 120. The blade protection cover 128 is disposed on a bottom surface of the inner body 120, and disposed to cover the rotating plate 127 and the plurality of blades 126.

A plurality of blades 126 may be rotatably mounted on a bottom surface of the rotating plate 127. One end portion of each of the plurality of blades 126 may be hinge-coupled to the rotating plate 127 by a fastening bolt, and the other end thereof may be folded inward or unfolded outward in a radial direction of the rotating plate 127 about the fastening bolt. According to such a configuration, the plurality of blades 126 may cut the grass while rotating together with the rotating plate 127 when the robot is traveling.

The blade protection cover 128 may be provided on a bottom surface of the lifting frame 123, and the blade protection cover 128 may be mounted in a vertically movable manner together with the lifting frame 123. The rotating plate 127 and the plurality of blades 126 may be disposed to be accommodated into the blade protection cover 128, and the rotating plate 127 may be spaced apart downward from an upper surface portion of the blade protection cover 128, and mounted rotatably with respect to the blade protection cover 128.

The blade protection cover 128 has a plurality of protrusion portions 1282 and a plurality of grass inlets in front, and the plurality of protrusion portions 1282 and the plurality of grass inlets may be alternately disposed apart from each other. The blade protection cover 128 may have inclined portions 1281 on right and left side surfaces and a rear surface thereof. The inclined portion 1281 may be extended in a downwardly inclined manner from an upper surface of the blade protection cover 128.

According to such a configuration, the inclined portion 1281 and the plurality of protruding portions 1282 may block stone fragments from being scattered in left-right and rearward directions and thrown out to an outside of the outer cover 100 when the blades 126 collide with stones or the like. In addition, the plurality of grass inlets may minimize resistance when the grass enters inward from a front side of the blade protection cover 128.

The plurality of blades 126, the rotating plate 127, and the blade protection cover 128 may be mounted in a vertically movable manner together with the lifting frame 123 to adjust the height of the plurality of blades 126. In order to adjust the height of the blade 126, the height adjusting knob 125 may be rotatably mounted on an upper portion of the inner body 120. A handle portion may be formed on an upper surface of the height adjusting knob 125 and extended in a radial direction, and configured to allow the user to rotate the height adjusting knob 125 while holding the handle portion.

The rotating cylindrical portion 124 may be coupled to a lower portion of the height adjusting knob 125, and rotatably mounted together with the height adjusting knob 125. A male screw portion may be formed on an outer circumferential surface of the rotating cylindrical portion 124. The rotating cylindrical portion 124 may be accommodated in the lifting frame 123.

A lowering limit portion may be provided at an upper end portion of the rotating cylindrical portion 124 and rotatably mounted on an upper portion of the inner body 120. A plurality of spiral protrusions may be formed on an inner circumferential surface of the lifting frame 123, and the spiral protrusions may be engaged with the male screw portions of the rotating cylindrical portion 124. Rotation limit portions are protruded from both sides of an outer circumferential surface of the lifting frame 123 to only allow the lifting frame 123 to move in a vertical direction with no rotation. According to such a configuration, in the lifting frame 123, the spiral protrusions may move in a vertical direction along the male screw portion as the rotating cylindrical portion 124 rotates.

A blade sealing portion 129 may be disposed between a lower portion of the inner body 120 and a bottom surface of the lifting frame 123. An upper end portion of the blade sealing portion 129 may be fastened to a lower portion of the inner body 120, and a lower end portion of the blade sealing portion 129 may be fastened to a bottom surface of the lifting frame 123 together with the blade protection cover 128.

A bellows-shaped corrugated portion may be extended in a length-adjustable manner in a vertical direction on a side surface of the blade sealing portion 129. According to such a configuration, the corrugated portion may be adjusted in length in a vertical direction by being unfolded or folded in a length direction, and watertightness may be maintained between a lower portion of the inner body 120 and the blade protection cover 128 even when the blade protection cover 128, the rotating plate 127, and the plurality of blades 126 move in a vertical direction together with the lifting frame 123, thereby preventing the blade drive motor 1231 from being damaged due to water infiltration into the inner body 120, for example, into the lifting frame 123.

The inner body 120 may include an inner body unit 121 and an inner body cover 122. A receiving space may be formed inside the inner body unit 121. The inner body cover 122 may be mounted to cover an upper portion of the inner body unit 121.

A semiconductor device such as an inverter for driving a motor and electrical devices such as a PCB or the like on which the semiconductor device and the like are mounted are mounted into the inner body 120, and a wire may be configured to electrically connect various types of electrical devices. A controller for controlling the blade drive motor 1231, the wheel drive motor 1141, and the like may be mounted inside the inner body 120. The controller may be configured to control an overall operation of the lawn mower robot. The controller may be implemented as a central processing unit (CPU) capable of processing data. Various software may be installed in the CPU.

Figure 4:
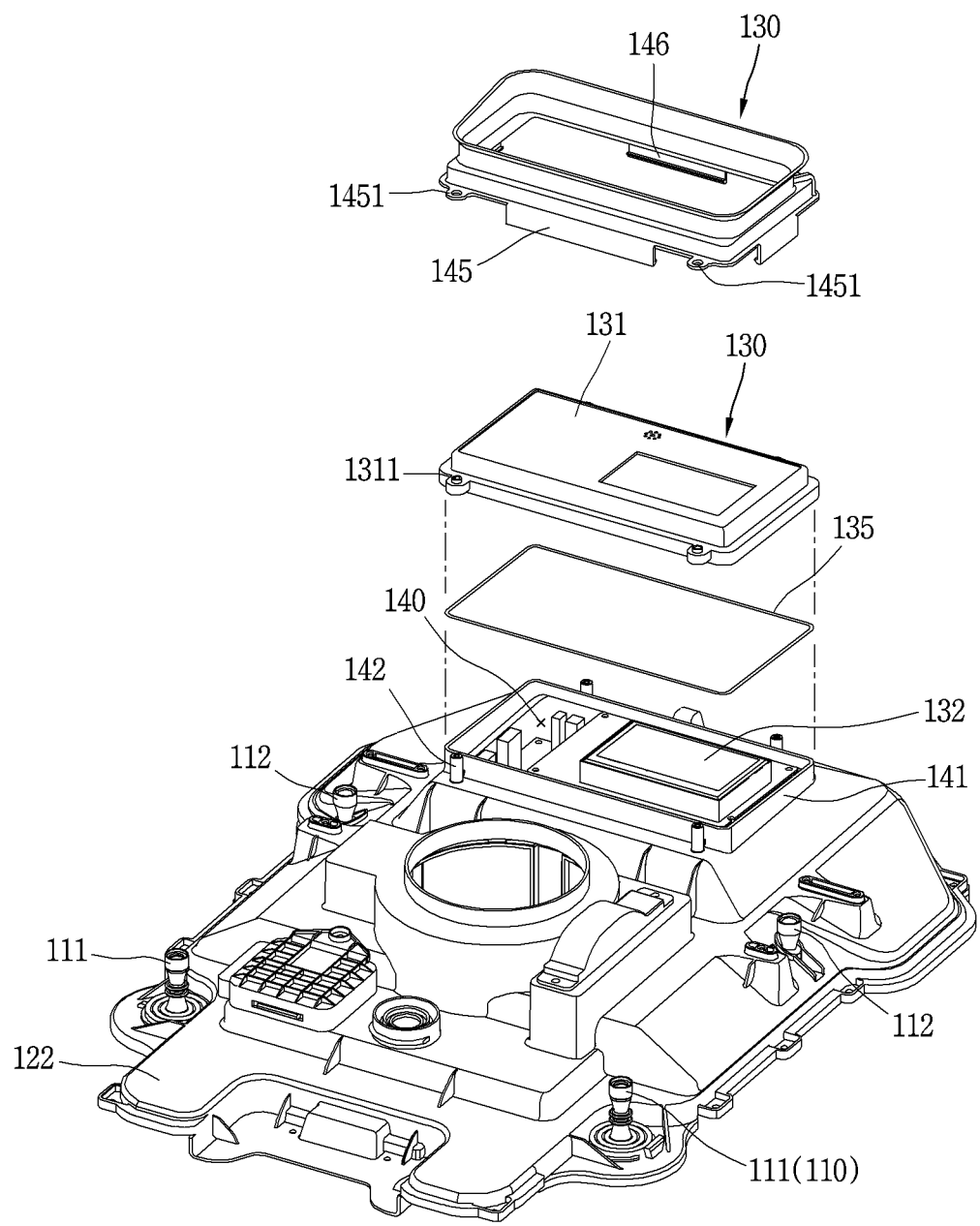
FIG. 4 is a conceptual view showing a state in which a UI module is disassembled in FIG. 3.
Figure 5:
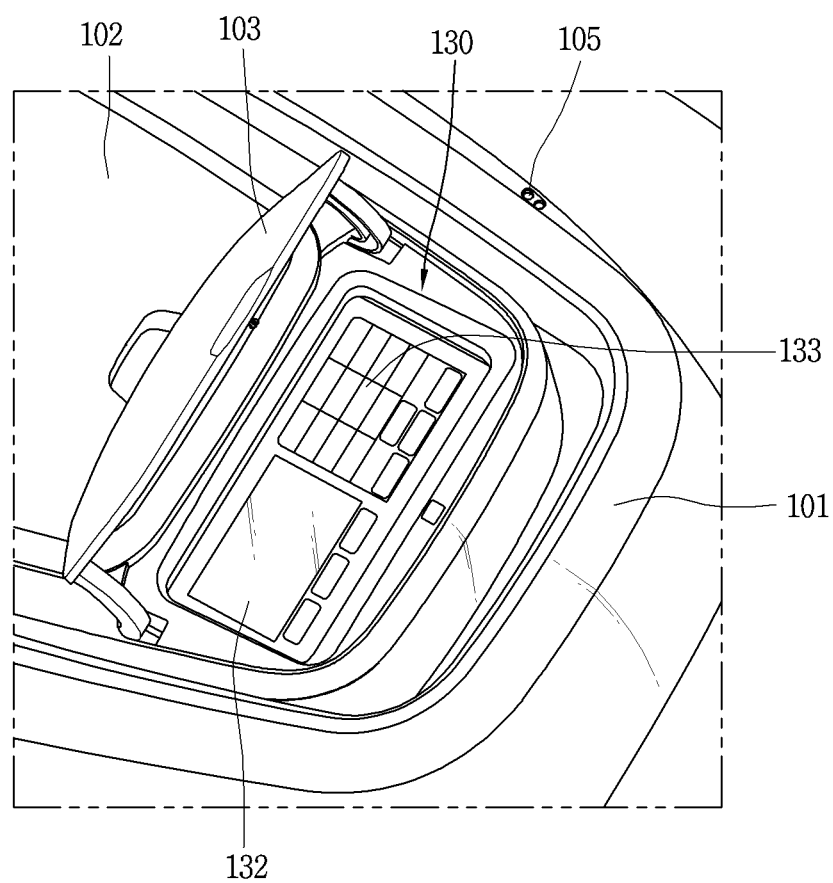
FIG. 5 is a conceptual view showing an UI cover subsequent to opening a second upper cover in FIG. 1.
Figure 6:
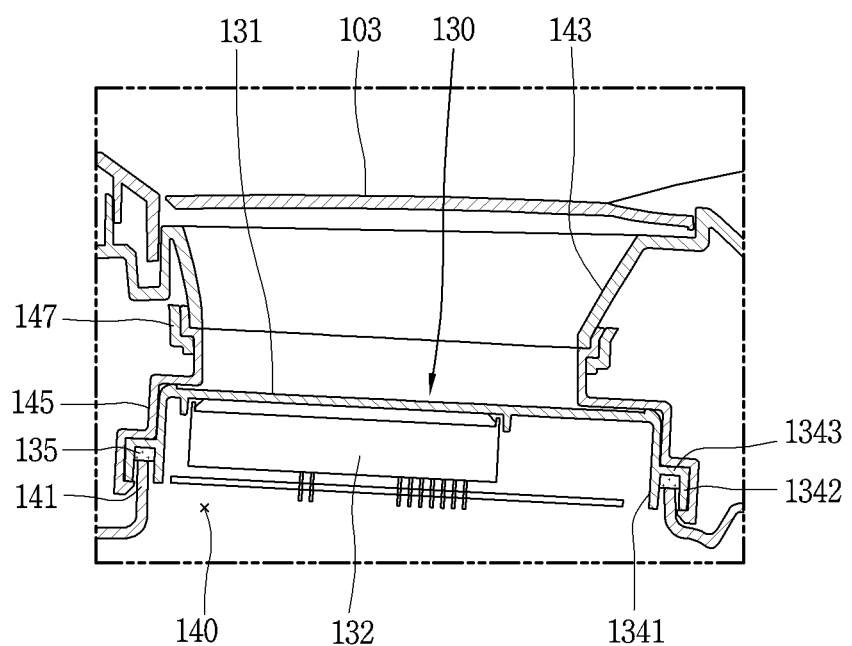
FIG. 6 is a cross-sectional view taken along line VI-VI in FIG. 2.
Figure 7:
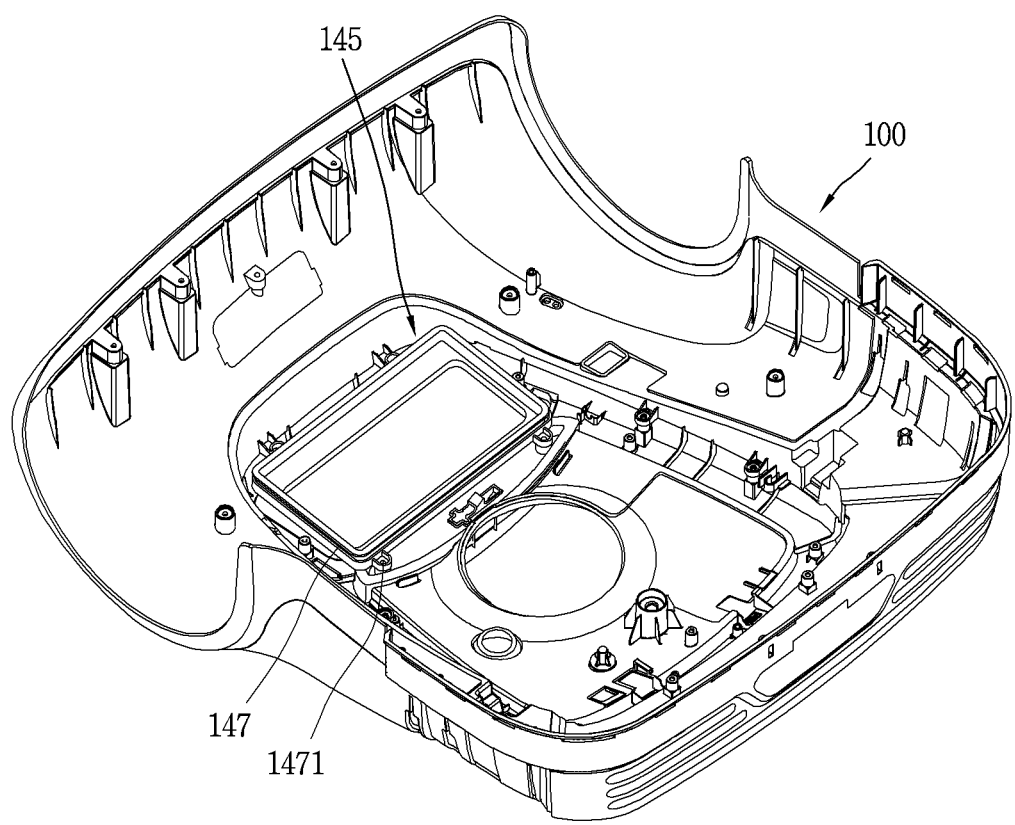
FIG. 7 is a conceptual view showing a state in which a dust cover is mounted into an outer cover according to the present disclosure.
Figure 8:
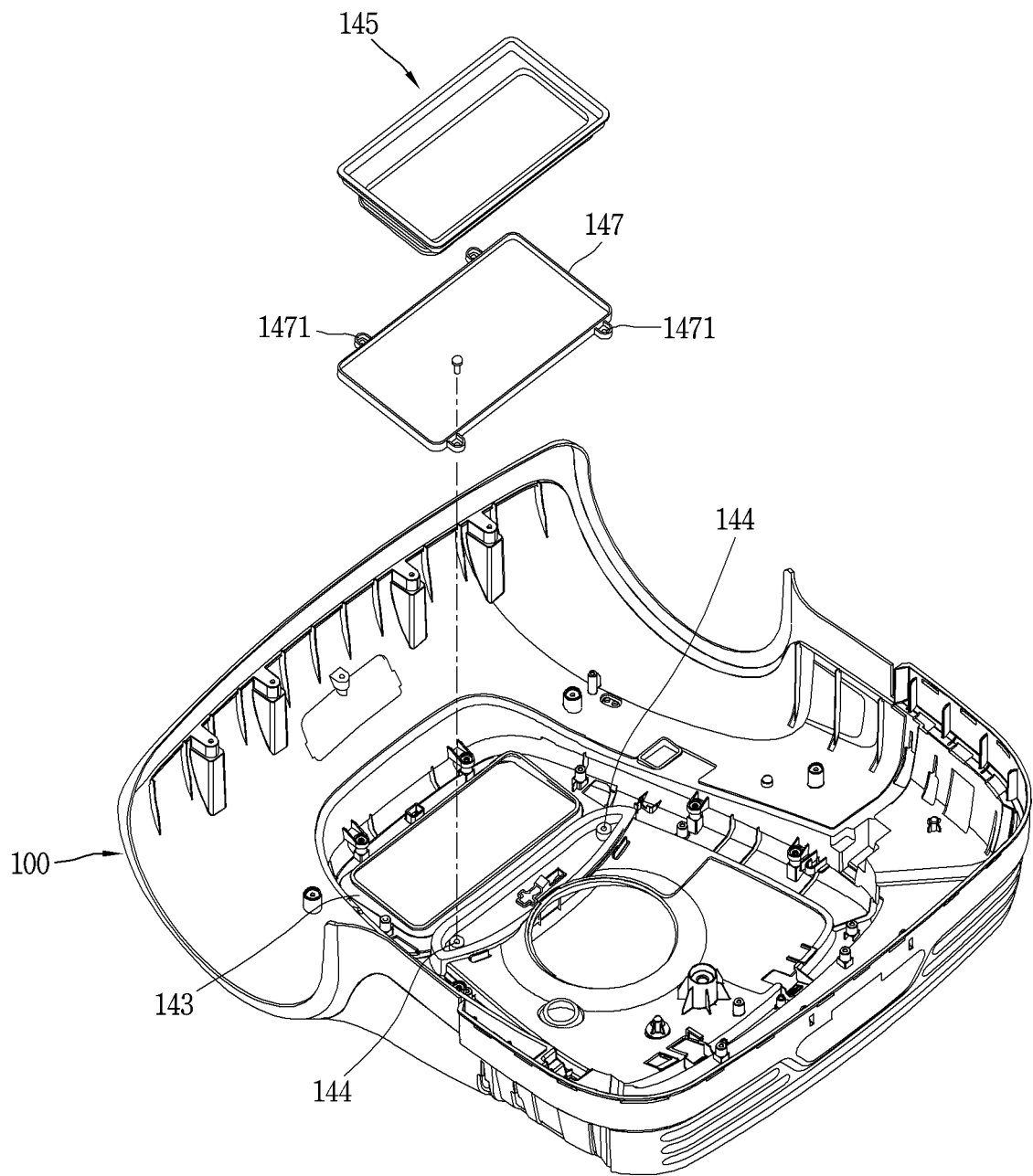
FIG. 8 is a conceptual view showing a state prior to mounting a dust cover on the outer cover in FIG. 7.

FIG. 4 is a conceptual view showing a state in which a UI module 130 is disassembled in FIG. 3, and FIG. 5 is a conceptual view showing an UI cover 131 subsequent to opening the second upper cover 103 in FIG. 1, and FIG. 6 is a cross-sectional view taken along line VI-VI in FIG. 2, and FIG. 7 is a conceptual view showing a state in which a dust cover is mounted into the outer cover 100 according to the present disclosure, and FIG. 8 is a conceptual view showing a state prior to mounting the dust cover on the outer cover 100 in FIG. 7.

A user interface (UI) module 130 may be mounted at a rear upper portion of the inner body cover 122. A plurality of operation buttons may be provided at an upper portion of the UI module 130 to allow the user to operate the robot so as to control the operation of the robot. The plurality of operation buttons may be implemented in various ways such as a button type, a touch type, and the like.

The UI module 130 may include a UI cover 131, an information display unit (or display) 132, and a UI PCB (Printed Circuit Board). The information display unit 132 may be configured to display information on the lawnmower robot for the user. The information display unit 132 may be implemented by an LCD panel or an LED panel to display information such as work schedule details, remarks, and current time. The UI PCB may be mounted at a lower portion of the information display unit 132.

The UI module 130 may be spaced apart from a lower portion of the second upper cover 103 to allow the user to operate the operation buttons of the UI module 130 or recognize information from the information display unit 132 when the second upper cover 103 is open. The UI module 130 may be assembled to be inserted downward into an upper portion of the inner body cover 122. A UI module receiving portion (or UI module receiving recess) 140 may be formed inside the inner body 120. The UI module receiving portion 140 may be formed to open upward in an upper portion of the inner body cover 122.

A UI sealing rib 141 may be extended to protrude upward from an upper portion of the UI module receiving portion 140. The UI sealing rib 141 may be configured in a rectangular box structure to receive the information display unit 132. The UI cover 131 may be mounted to cover an upper portion of the UI module receiving portion 140. The UI cover 131 may have a double sealing rib structure along an edge portion thereof. The double sealing rib may include a first sealing rib 1341, a second sealing rib 1343, and a rib connecting portion 1343. The first sealing rib 1341 may be extended to protrude downward from an edge of the UI cover 131.

The second sealing rib 1342 may be extended to protrude downward from an edge of the UI cover 131, and spaced apart outward from the first sealing rib 1341 in front-rear and left-right directions. The rib connection portion 1343 is configured to horizontally extend from an upper end of the first sealing rib 1341 to an upper end of the second sealing rib 1342 to connect the first sealing rib 1341 and the second sealing rib 1342. A rib receiving groove may be formed between the first sealing rib 1341 and the second sealing rib 1342.

The UI sealing rib 141 of the inner body cover 122 may be inserted into and coupled to the rib receiving groove. The first sealing rib 1341 and the second sealing rib 1342 of the UI cover 131 and the UI sealing rib 141 may be arranged to overlap with each other in front-rear and left-right directions of the UI cover 131, thereby improving sealing performance.

A UI sealer 135 may be inserted into the rib receiving groove. The UI sealer 135 has a rectangular cross-sectional shape and may be formed in a rectangular shape along an edge of the UI cover 131. The UI sealer 135 can be coupled and fixed to the rib receiving groove in a forced fit manner. When the UI cover 131 is mounted on an upper portion of the inner body cover 122, the UI sealer 135 may be disposed between an upper end of the UI sealing rib 141 and the rib receiving groove of the UI cover 131 to maintain airtightness between 122 and the UI cover 131, thereby preventing water or the like from infiltrating into the inner body 120 through an upper portion of the UI module receiving portion 140.

A plurality of boss portions (or bosses) 142 may be formed on an upper surface of the inner body cover 122 so as to protrude upward. The plurality of boss portions 142 may be spaced apart in front left-right and rear left-right directions of the UI sealing rib 141. Fastening grooves may be formed inside the plurality of boss portions 142.

A plurality of fastening portions (or fastening extensions) 1311 may be formed on front and the rear surfaces of the UI cover 131 so as to protrude in a front-rear direction. The plurality of fastening portions 1311 may be spaced apart in a left-right direction of the inner body 131. Each of the plurality of fastening portions 1311 may be formed with a fastening hole therethrough.

The plurality of boss portions 142 may be arranged to face the fastening portions 1311 of the UI cover 131 in an up-down direction so that fastening members such as screws are fastened to the fastening grooves of the boss portions through the fastening portions 1311 of the UI cover 131, thereby fastening the UI cover 131 and the inner body cover 122 to each other.

According to such a configuration, the fastening portion 1311 of the UI cover 131 may be disposed outside the UI sealer 135, thereby blocking water from infiltrating into the UI sealer 135 through a fine gap. Furthermore, the UI sealer 135 may be pressed against the UI cover 131 and the UI sealing rib 141 by a fastening force while fastening the UI cover 131 to the inner body cover 122 to further improve sealing performance.

A user control panel 133 may be mounted in a pushable manner on an upper portion of the UI cover 131, thereby allowing the user to operate the user control panel 133 by pressing the panel 133 so as to control the robot. The user control panel 133 may be formed with a keypad, for example, and implemented in any form as long as it can receive the user's input to operate the lawn mower robot.

A display opening portion may be formed in a penetrating manner in an upper portion of the UI cover 131, and configured to expose part of the information display unit 132 for displaying information in an upward direction. A lower portion of the outer cover 100 is open downward to allow external dust or the like to enter into the outer cover 100 through a lower opening portion of the outer cover 100.

Dust or the like generated between an inner side of the outer cover 100 and the inner body cover 122 may be caught on an upper portion of the UI cover 131 to cause a malfunction of the user control panel 133 or a poor view of information on the display unit. In order to solve such a problem, the present disclosure may be provided with a UI dust cover (or dust barrier) 145 inside the outer body.

The UI dust cover 145 is configured to isolate the UI cover 131 from dust or the like scattering in a space between the outer cover 100 and the inner body cover 122. The UI dust cover 145 may be formed in a rectangular box structure in a shape corresponding to the UI cover 131. The UI dust cover 145 may be made of a rubber or rigid plastic or metal material.

The cover extension portion (or cover extension region) 143 may be protruded downward from a rear upper portion (or upper region) of the outer cover 100 toward the UI cover 131. The UI dust cover 145 may be disposed between an inner surface of the outer cover 100 and an upper surface of the UI cover 131. An upper portion of the UI dust cover 145 may be configured to enclose the cover extension portion 143 and a lower portion of the UI dust cover 145 may be configured to enclose the second sealing rib 1342 of the UI cover 131.

The UI dust cover 145 may be extended in a vertical direction to partition an upper space of the UI cover 131 within an inner space of the outer cover 100, and communicated with the cover extension portion 143. A lower portion of the cover extension portion 143 may be accommodated into the UI dust cover 145. An upper end portion of the UI dust cover 145 may be fastened to the outer cover 100, and a lower end portion of the UI dust cover 145 may be fastened to the UI cover 131.

A fastening frame 147 may be configured to enclose an upper portion of the UI dust cover 145 to fasten the UI dust cover 145 and the outer cover 100. The fastening frame 147 may have a rectangular box structure in a shape corresponding to the UI dust cover 145. The fastening frame 147 may be formed to be larger than a lower end portion size of the cover extension portion 143 by the thickness of an upper end portion of the UI dust cover 145.

The fastening frame 147, the UI dust cover (or dust cover) 145, and the cover extension portion 143 may be arranged to overlap with one another in a thickness direction. A plurality of fastening portions (or fastening extensions) 1471 may be formed on front and rear portions of the fastening frame 147, respectively. Each of the plurality of fastening portions 1471 may be formed with a fastening hole in a vertical direction.

The plurality of boss portions (or bosses) 142 may be formed to protrude on an inner surface of the outer cover 100. The plurality of boss portions 142 may be spaced apart on an outside of the cover extension portion 143. Fastening grooves may be respectively formed inside the plurality of boss portions 142.

The plurality of boss portions 142 and the fastening portions 1471 of the fastening frame 147 may be arranged so as to overlap each other in an upward direction. According to such a configuration, the UI dust cover 145 is fitted and coupled to enclose an outer surface of the cover extension portion 143, and the fastening frame 147 is fitted and coupled to enclose an outer surface of the UI dust cover 145, thereby pressing and fixing the outer surface of the UI dust cover 145 with the cover extension portion 143.

Furthermore, a fastening member such as a screw may be fastened to the boss portion 142 through the fastening portion 1471 of the fastening frame 147, and the UI dust cover 145 may be fastened to an inside of the outer cover 100 by the fastening frame 147. A plurality of fastening portions may be provided at an upper end portion of the UI dust cover 145 without the fastening frame 147 to fasten the upper end portion of the UI dust cover 145 to the outer cover 100, and thus the UI dust cover 145 may be directly fastened to the outer cover 100 through the fastening portions.

A fastening hook 146 may be formed at a lower end of the UI dust cover 145 such that the fastening hook 146 is caught by a lower end of the second sealing rib 1342 of the UI cover 131, and a lower end portion of the UI dust cover 145 may be fastened to the UI cover 131.

A plurality of fastening portions 1451 may be horizontally extended in a forward direction from both front left and right sides of the UI dust cover 145, and the plurality of fastening portions 1451 may be horizontally extended in a rearward direction from both rear left and right sides of the UI dust cover 145. Each of the plurality of fastening portions 1451 may be formed with a fastening hole therethrough.

The fastening portion 1451 of the UI dust cover 145 may be arranged to overlap with the boss portion 142 of the inner body cover 122 in a vertical direction. According to such a configuration, a fastening member such as a screw may be fastened to the fastening groove of the boss portion 142 through the fastening portion 1451 of the UI dust cover 145, and thus a lower end portion of the UI dust cover 145 and the inner body cover 122 may be fastened to each other.

Therefore, according to the present disclosure, the UI dust cover 145 may connect an upper space of the UI cover 131 to the cover extension portion 143 formed to be open at an upper portion of the outer cover 100 in a communicating manner, and isolate the upper space of the outer cover 100 from an inner space of the outer cover 100, thereby blocking dust or the like introduced into the outer cover 100 from entering into the information display unit 132 and the user control panel 133 of the UI cover 131.

An upper cover may be rotatably mounted at an upper portion of the outer cover 100 to cover the cover extension portion 143 to allow a user to open the upper cover, thereby having an advantage of easily manipulating the user control panel 133 of the UI module 130 or acquiring necessary information through the display screen. In addition, the upper cover may be closed in normal times to prevent dust from accumulating on the display screen or the user control panel 133, thereby minimizing the possibility of erroneous operation or malfunction of the user control panel 133, and enhancing visibility since the display screen is clean.

Besides, an upper end portion of the UI dust cover 145 may be disposed to receive and enclose a lower portion of the cover extension portion 143, and the fastening frame 147 may be formed in a rectangular box shape corresponding to the cover extension portion 143, and formed to be larger than the cover extension portion 143 by the thickness of the UI dust cover 145, thereby enclosing the upper end portion of the UI dust cover 145 so as to be firmly pressed against and fastened to the cover extension portion 143. In addition, a lower end portion of the UI dust cover may be provided with a fastening hook 146 to enclose an outer edge portion of the UI cover 131 and to be caught at a lower end of the UI cover 131, thereby facilitating assembly and improving sealing performance.

The second upper cover 103 may be mounted at an upper portion of the outer cover 100 to enclose the cover extension portion 143, and configured with a structure in which a front end portion thereof is hinge-coupled to the outer cover 100 and a rear end portion thereof is open and closed in a vertical direction while rotating in a vertical direction, but the present disclosure may not be limited thereto, and may be open and closed in such a manner that is slidable in a front-rear direction.

The present disclosure is contrived to solve the foregoing problems, and an object of the present disclosure is to provide a lawn mower robot having a dust cover for a user interface (UI) capable of preventing dust from entering into a display screen and a keypad (corresponding to a user control panel in the present disclosure).

In order to achieve the foregoing objective, a lawn mower robot according to an example of the present disclosure may include an outer cover; an inner body accommodated into the outer cover to mount a plurality of wheels for traveling on both sides thereof; a plurality of blades rotatably mounted on a bottom surface of the inner body to mow the grass; a plurality of support portions arranged in front-rear and left-right directions on an upper portion of the inner body to movably support the outer cover in front-rear and left-right directions with respect to the inner body; a UI module mounted on an upper portion of the inner body, and provided with a user control panel and an information display unit on an upper portion thereof; and a UI dust cover mounted on an inner side of the outer cover to block dust inside the outer cover from entering into the user control panel and the information display unit.

According to an example associated with the present disclosure, the outer cover may include a cover extension portion extended downward from an upper portion of the outer cover and opened in a vertical direction to communicate with the information display unit and the user control panel; and an upper cover mounted on an upper portion of the outer cover to open and close the cover extension portion.

According to an example associated with the present disclosure, the UI dust cover may be extended in a vertical direction, and an upper end portion of the UI dust cover may be connected to an upper portion of the outer cover, and a lower end portion of the UI dust cover may be connected to an upper portion of the UI module to isolate a space extended upward between inner surfaces of the outer cover from the upper portion of the UI module from an inner space of the outer cover.

According to an example associated with the present disclosure, the outer cover may be open in a downward direction, and an inner surface of the outer cover may be vertically spaced apart from the inner body. According to an example associated with the present disclosure, the UI dust cover may be configured in a rectangular box shape to enclose the four sides of an upper portion of the UI module.

According to an example associated with the present disclosure, an upper end portion of the UI dust cover may enclose an outer surface of the cover extension portion, and the UI dust cover may be fastened to an inner surface of the outer cover by a fastening frame configured to enclose the upper end portion of the UI dust cover.

According to an example associated with the present disclosure, the fastening frame may be configured in a rectangular box shape larger than the cover extension portion in size by the thickness of the UI dust cover. According to an example associated with the present disclosure, a plurality of fastening portions may be protruded in a front-rear direction from front and rear surfaces of the fastening frame, respectively, and a plurality of boss portions may be protruded from an inner surface of the outer cover in a direction facing the plurality of fastening portions such that the plurality of fastening portions and the plurality of boss portions are fastened to each other.

According to an example associated with the present disclosure, the inner body may include a UI module receiving portion formed upward at a rear upper portion of the inner body; and a UI sealing rib protruded upward from an upper portion of the UI module receiving portion, and the UI module may include a UI cover provided with the user control panel, and mounted to cover the information display unit, and the UI cover is mounted to enclose the UI sealing rib and cover the UI module receiving portion, and the UI dust cover may be provided with a fastening hook at a lower end thereof, and fastened to enclose the UI cover.

According to an example associated with the present disclosure, the UI dust cover further may further include a plurality of fastening portions protruded in a front-rear direction from front and rear surfaces thereof, respectively, and a plurality of boss portions may be protruded from an upper portion of the inner body in a direction facing the plurality of fastening portions such that the plurality of fastening portions and the plurality of boss portions are fastened to each other.

Aspects of the lawn mower robot according to the present disclosure will be described as follows. First, a UI dust cover may connect an upper space of the UI cover to a cover extension portion formed to be open at an upper portion of an outer cover in a communicating manner, and isolate the upper space of the UI cover from an inner space of the outer cover, thereby blocking dust or the like introduced into the outer cover from entering into an information display unit and a user control panel of the UI cover.

Second, an upper cover is rotatably mounted at the upper portion of the outer cover to cover the cover extension portion to allow a user to open the upper cover, thereby having an advantage of easily manipulating the user control panel of a UI module or acquiring necessary information through a display screen. Third, the upper cover may be closed in normal times to prevent dust from accumulating on the display screen or the user control panel, thereby minimizing the possibility of erroneous operation or malfunction of the user control panel, and enhancing visibility since the display screen is clean.

Fourth, an upper end portion of the UI dust cover may be disposed to receive and enclose a lower portion of the cover extension portion, and a fastening frame may be formed in a rectangular box shape corresponding to the cover extension portion, and formed to be larger than the cover extension portion by the thickness of the UI dust cover, thereby enclosing the upper end portion of the UI dust cover so as to be firmly pressed against and fastened to the cover extension portion.

Fifth, a lower end portion of the UI dust cover may be provided with a fastening hook to enclose an outer edge portion of the UI cover and to be caught at a lower end of the UI cover, thereby facilitating assembly and improving sealing performance.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
    an outer cover;
    an inner frame coupled to the outer cover, a plurality of wheels being coupled to sides thereof;
    one or more blades rotatably mounted on a lower surface of the inner frame to mow grass;
    a plurality of support posts that connect the outer cover and the inner frame;
    a user interface (UI) module provided at an upper surface of the inner frame, the UI module including a user control panel and a display at an upper region thereof; and
    a dust barrier provided at an inner surface of the outer cover and configured to block dust inside the outer cover from the user control panel and the display.

2. The lawn mower robot of claim 1, wherein the outer cover includes:
    a cover extension region that extends downward from an upper region of the outer cover and opens in a vertical direction to communicate with the display and the user control panel; and
    an upper cover coupled to the upper region of the outer cover to open and close the cover extension region.

3. The lawn mower robot of claim 2, wherein an upper end region of the dust barrier is positioned over an outer surface of the cover extension region, and
    the dust barrier is coupled to the inner surface of the outer cover by a fastening frame configured to enclose the upper end region of the dust barrier.

4. The lawn mower robot of claim 3, wherein the fastening frame is configured to have a rectangular box shape that is larger in size than the cover extension region by a thickness of the dust barrier.

5. The lawn mower robot of claim 3, wherein a plurality of fastening extensions protrude in a front-rear direction from front and rear surfaces of the fastening frame, and
    a plurality of bosses protrude from the inner surface of the outer cover in a direction facing the plurality of fastening extensions such that the plurality of fastening extensions and the plurality of bosses are brought into contact to be fastened to each other.

6. The lawn mower robot of claim 1, wherein the dust barrier extends in a vertical direction, and an upper end region of the dust barrier is connected to the upper region of the outer cover, and a lower end of the dust barrier is connected to an upper region of the UI module to be positioned in a space between the inner surface of the outer cover and the upper region of the UI module.

7. The lawn mower robot of claim 1, wherein the outer cover is open in a downward direction, and the inner surface of the outer cover is vertically spaced apart from the inner frame.

8. The lawn mower robot of claim 1, wherein the dust barrier is configured to have a rectangular box shape to enclose sides of an upper region of the UI module.

9. The lawn mower robot of claim 1, wherein the inner frame includes:
    a receiving recess formed to open upward at a rear upper region of the inner frame; and
    a sealing rib protruded upward from an upper region of the receiving recess, and
    the UI module further includes:
        a UI cover provided with the user control panel, and mounted to cover the display, wherein the UI cover is mounted to enclose the UI sealing rib and cover the UI module receiving portion, and the dust barrier includes a fastening hook at a lower end thereof, and fastened to enclose the UI cover.

10. The lawn mower robot of claim 9, wherein the dust barrier further includes a plurality of fastening extensions protruded in a front-rear direction from front and rear surfaces thereof, and
    the lawn mower robot further comprises a plurality of bosses that extend from the upper surface of the inner frame in a direction facing the plurality of fastening extensions such that the plurality of fastening extensions and the plurality of bosses contact each other to be fastened together.

11. A lawn mower robot, comprising:
    an outer cover;
    an inner frame coupled to the outer cover, a plurality of wheels being coupled to sides thereof;
    one or more blades rotatably mounted on a lower surface of the inner frame to mow grass;
    a user interface (UI) module provided at an upper surface of the inner frame, the UI module including a user control panel and a display at an upper region thereof;
    a dust barrier provided at an inner surface of the outer cover and configured to cover side surfaces of the user control panel and the display; and
    a fastening frame configured to enclose an upper end region of the dust barrier.

12. The lawn mower robot of claim 11, wherein the outer cover includes:
    a cover extension region that extends downward from an upper region of the outer cover and opens in a vertical direction to communicate with the display and the user control panel; and
    an upper cover coupled to the upper region of the outer cover to open and close the cover extension region.

13. The lawn mower robot of claim 12, wherein an upper end region of the dust barrier is positioned over an outer surface of the cover extension region, and the dust barrier is coupled to the inner surface of the outer cover by the fastening frame.

14. The lawn mower robot of claim 2, wherein the fastening frame is configured to have a rectangular box shape that is larger in size than the cover extension region by a thickness of the dust barrier.

15. The lawn mower robot of claim 11, further comprising:
- a plurality of fastening extensions that protrude from front and rear surfaces of the fastening frame, and
- a plurality of bosses that protrude from the inner surface of the outer cover in a direction facing the plurality of fastening extensions such that the plurality of fastening extensions and the plurality of bosses are brought into contact to be fastened to each other.

16. The lawn mower robot of claim 11, wherein the dust barrier extends in a vertical direction, and an upper end region of the dust barrier is connected to the upper region of the outer cover, and a lower end of the dust barrier is connected to an upper region of the UI module to be positioned in a space between the inner surface of the outer cover and the upper region of the UI module.

17. The lawn mower robot of claim 11, wherein the outer cover is open in a downward direction, and the inner surface of the outer cover is vertically spaced apart from the inner frame.

18. The lawn mower robot of claim 11, wherein the dust barrier has a rectangular box shape configured to enclose sides of the UI module.

19. The lawn mower robot of claim 11, wherein the inner frame includes:
- a receiving recess formed to open upward at a rear upper region of the inner frame; and
- a sealing rib protruded upward from an upper region of the receiving recess, and the UI module further includes:
- UI cover provided with the user control panel, and mounted to cover the display, wherein the UI cover is mounted to enclose the UI sealing rib and cover the UI module receiving portion, and the dust barrier includes a fastening hook at a lower end thereof.

20. The lawn mower robot of claim 11, further comprising:
- a plurality of support posts configured to connect the outer cover and the inner frame, the plurality of support posts being flexible to enable the outer cover to move relative to the inner frame.

* * * * *